Oct. 23, 1951 O. PHIPPS 2,572,280
DRILL STOCK POWER-DRIVE COUPLING
Filed Nov. 26, 1946

INVENTOR:
ORVILLE PHIPPS
BY
ATTORNEY

Patented Oct. 23, 1951

2,572,280

UNITED STATES PATENT OFFICE 2,572,280

DRILL STOCK POWER DRIVE COUPLING

Orville Phipps, Denver, Colo.

Application November 26, 1946, Serial No. 712,459

1 Claim. (Cl. 279—75)

This invention relates to couplings for the transmission of simultaneously-developed axial thrust and axially-coincident rotation from a prime mover or driven member to a working tool, and has as an object to provide an improved construction and interrelation of elements constituting such a coupling.

A further object of the invention is to provide an improved power-transmitting coupling characterized by facility of driving and driven member interconnection and separation without the use of tools.

A further object of the invention is to provide an improved power-transmitting coupling particularly adapted for efficient performance and convenience of use in certain types of drilling operations.

A further object of the invention is to provide an improved power-transmitting coupling effective for the guiding support of a tool in driven association therewith.

A further object of the invention is to provide an improved power-transmitting coupling that is simple and inexpensive of manufacture in a variety of sizes and proportions fitted to particular operating needs and conditions, that is convenient of operative association with existing types and constructions of powered driving elements, that is durable, long-lived, and efficient in operation, and that is productive in use of operating advantages and economies.

With the foregoing and other objects in view, my invention consists in the construction, arrangement, and combination of elements hereinafter set forth, pointed out in my claim, and illustrated by the accompanying drawing, in which—

Figure 1:
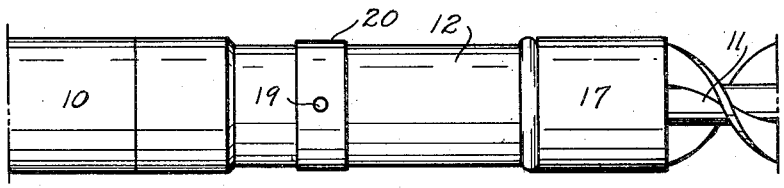
Figure 2:
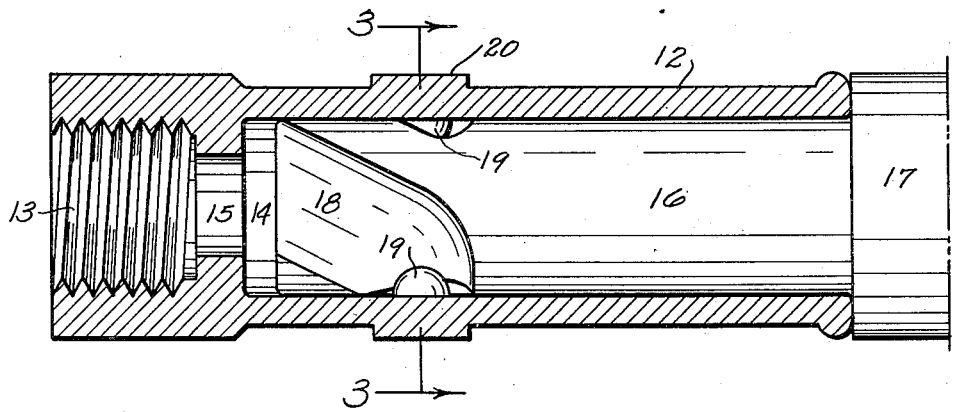
Figures 3, 4:
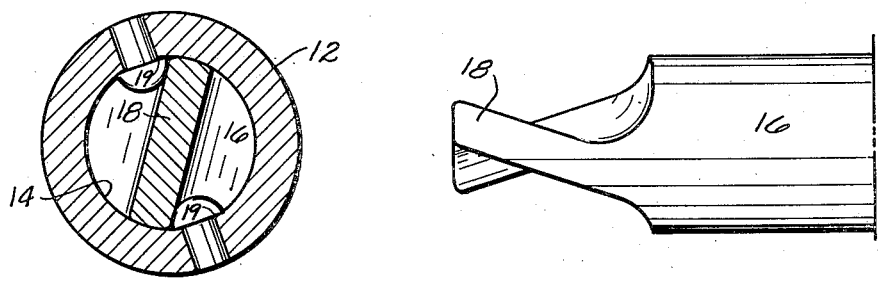

Figure 1 is a side elevation of a typical embodiment of the invention as assembled and positioned ready for practical use, elements of the complete operative assembly not essential to an understanding of the invention being omitted or broken away. Figure 2 is a section, on an enlarged scale, taken axially through that portion of Figure 1 comprising the improved coupling. Figure 3 is a cross section taken on substantially the indicated line 3—3 of Figure 2. Figure 4 is a fragmentary, detail elevation, substantially at a right angle to the showing of Figure 2, of a shank member comprised in the invention.

In many operations, and particularly in the development of drilled holes incident to mining, it is conventional practice to power a tool for rotation about its axis and simultaneous axial advance against and through the material being worked in a manner to permit convenient removal, replacement, and interchange of the tool. When applied to the drilling of holes for mining purposes, the apparatus commonly employed consists of a prime mover in rotatably-driving and axially-advancing relation with a stem whereto an auger, or analogous length of drill stock, carrying a drill bit on its free end, is operatively connected, and it is to the provision of an improved coupling for the interconnection of such a tool with its driving stem that the instant invention is directed.

In the illustrated construction of the improvement, the numeral 10 designates the free, or tool-connectible, end of a stem or shaft powered for rotation about its axis and for simultaneous axial translation and the numeral 11 identifies the inner or attachment end of a typical drill auger associated, by means of the improved coupling, in driven relation with and as an axial extension of the stem 10. The end of the stem 10 is worked, in accordance with standard practice, for connection with a tool or coupling member, such working commonly taking the form of external threads, and the improved coupling includes an elongate, cylindrical, socket member 12 axially recessed and worked at one of its ends for mounting cooperation with the stem 10 end, the construction represented by the drawing including an internally-threaded bore 13 in and axially of one end of the member 12 adapted to receive and coact with a correspondingly-threaded end boss on the stem 10 to mount said member 12 securely on and as an axially-coincident extension of the stem, the pitch of the member and stem boss threads being such as to tighten the member on and to the stem as the latter is power-rotated to effect rotation of said member and the tool therewith associated.

The end of the member 12 remote from connection with the stem 10 is intersected by a smooth, straight, cylindrical, axial bore which traverses the major portion of the member length to form an end-opening socket 14 which, for practical convenience and facility of member manipulation, may communicate through a throat 15 with the inner end of the mounting bore 13. The socket 14 is adapted to slidably receive, position, and support a suitably sized and proportioned, cylindrical shank 16 fixed securely to and as an axial extension of the attachment end of the auger 11, or analogous tool, said shank having an annular, radially-expanded boss 17 defining an angular shoulder where it attaches to the tool and a length outwardly beyond said shoulder slightly less than the depth of the socket 14, so that when said shank is fully entered within said socket to bearing engagement of the member 12 annular end against the shoulder of the boss 17, as shown in Figure 2, the end of the shank within the socket is held away from and out of bearing engagement against the said socket inner end. The shank 16 with its preferably integral boss 17 may be formed on or secured to the attachment end of the tool element 11 in any desired or expedient manner, it being within the contemplation of the invention that said shank and boss may be formed separate from the tool and subsequently welded, riveted, brazed, or pinned thereto, that the shank and boss unit may be formed integrally with and as an original part of the tool, or that a separately-formed shank and boss unit may be worked for selectively-separable and consequent interchangeable interconnection with correspondingly-worked tool attachment ends.

At its end remote from the associated boss 17 and tool 11, the shank 16 is worked to the form of an axially-projecting, diametric web 18 merging at its side margins with the projected cylindrical surface of the shank and slightly skewed or twisted to a spiral pitch corresponding in inclination with that of the auger 11. Opposite faces of the web 18 are parallel throughout the greater extent of said web inwardly from its free end and diverge adjacent the web root to merge into the shank body through reversely directed curves, thereby providing a concave pocket or recess in each face and adjacent the root of the web 18 whereof the arc of greatest depth leads in the direction of desired tool rotation and is angularly offset in advance of the line of corresponding face intersection with the web free end. It is through the web 18 that power-rotation of the stem 10 and member 12 is transmitted to effect rotation of the shank 16 and associated tool 11, for which purpose studs or lugs 19 fixedly project in diametric opposition inwardly from the member 12 as obstructions within the socket 14 thereof and in position to simultaneously bear against opposite skewed faces of the web 18 at points adjacent the web root when the shank is fully entered within said socket. The elements 19 may, of course, be formed integrally with the member 12, if expedient or desired, but economy and facility of manufacture suggest the advantage of the arrangement shown in Figure 3, wherein said elements have the form of round-headed studs with their shanks seated and secured within registered holes diametrically intersecting the member walls. To more effectively withstand the loads concentrated on the studs or lugs 19, the member 12 wall may be thickened about and adjacent said elements as an annular band 20, as illustrated.

With the components of the improved coupling constructed as shown and described, the shank 16 telescopes freely within and is susceptible of ready manipulation to coaction with and separation from the member 12, the web 18 arrow end passing freely between the elements 19 to permit, through possible slight angular adjustment of the shank 16 relative to the member 12, reception of the shank length within the socket 14 and bearing engagement of the said member annular end against the shoulder of the boss 17. When and as so engaged within the socket 14 of the member 12, the relatively long shank 16 functions to mount the associated tool 11 in maintained axial alignment with the stem 10 in a manner that minimizes tendency of the tool working end to wander or deviate, and engagement of the elements 19 against the spiraled margins of the shank web 18 incidental to stem 10 and member 12 rotation acts to simultaneously and correspondingly rotate the shank and tool while maintaining a component thrust on the web margins effective to urge the shank inwardly of the socket with the boss 17 solidly against the member 12 end and in position to transmit tool-feeding thrust from the stem 10 to the tool.

When, for any reason, it is desired to retract the tool from the hole being drilled, the direction of stem axial translation is reversed and the direction of assembly rotation maintained the same as for drilling, the axially-directed force component consequently developed between the spiraled web 18 margins and the elements 19 being adequate to hold the shank 16 against separation from its socket 14 and to effect tool withdrawal from a cleanly scavenged hole so long as the friction acting on the tool is sufficient to inhibit any angular overrunning of the tool and shank relative to the member 12.

Since changes, variations, and modifications in the specific form, construction, and arrangement of the elements shown and described may be had without departing from the spirit of my invention, I wish to be understood as being limited solely by the scope of the appended claim, rather than by any details of the illustrative showing and foregoing description.

I claim as my invention:

A coupling for driving interconnection between a power-rotatable, axially-translatable stem and a rotatably-effective tool, comprising a cylindrical member, means on one end of said member engageable with an end of said stem to mount the member as an axial extension of and for rotation and translation with said stem, a relatively-deep, cylindrical socket axially of said member and opening through the other end thereof, a cylindrical shank telescopically receivable within said socket fixed to the attachment end of said tool as an axial extension thereof, said shank and socket walls interfitting for alignment and guided support of said tool, an annular boss surrounding the shank base to define a thrust-transmitting shoulder engageable by the socket member annular end, spaced, diametrically-opposed studs radially interrupting said socket toward the inner end thereof, and a skewed web diametrically outstanding axially from and terminating said shank within said socket for non-gripping engagement against said studs as an incident of member rotation to rotatively lock said shank to said member and to urge said shank inwardly of its socket.

ORVILLE PHIPPS.

REFERENCES CITED

The following references are of record in the file of this patent:

UNITED STATES PATENTS

| Number | Name | Date |
| --- | --- | --- |
| 337,474 | Bartlett | Mar. 9, 1886 |
| 965,131 | Bliss | July 19, 1910 |
| 1,020,544 | Echols | Mar. 19, 1912 |
| 2,219,907 | Ross | Oct. 29, 1940 |
| 2,451,922 | Cox | Oct. 19, 1948 |

FOREIGN PATENTS

| Number | Country | Date |
| --- | --- | --- |
| 26,810 | Great Britain | 1909 |
| 564,000 | Great Britain | 1944 |